United States Patent
Searcy et al.

(10) Patent No.: US 10,707,958 B2
(45) Date of Patent: Jul. 7, 2020

(54) METHOD AND APPARATUS FOR DETERMINING A MAXIMUM TRANSMISSION CAPACITY WITHIN AN OPTICAL NETWORK

(71) Applicant: ADVA Optical Networking SE, Meiningen OT Dreissigacker (DE)

(72) Inventors: Steven Searcy, Atlanta, GA (US); Sorin Tibuleac, Johns Creek, GA (US); Jie Pan, Atlanta, GA (US); Thomas Richter, Atlanta, GA (US)

(73) Assignee: ADVA OPTICAL NETWORKING SE, Meiningen Ot Dreissigacker (DE)

( * ) Notice: Subject to any disclaimer, the term of this patent is extended or adjusted under 35 U.S.C. 154(b) by 0 days.

(21) Appl. No.: 16/119,531

(22) Filed: Aug. 31, 2018

(65) Prior Publication Data

US 2020/0076501 A1    Mar. 5, 2020

(51) Int. Cl.
*H04J 14/02* (2006.01)
*H04B 10/079* (2013.01)
(Continued)

(52) U.S. Cl.
CPC . *H04B 10/07953* (2013.01); *H04B 10/07955* (2013.01); *H04B 10/506* (2013.01);
(Continued)

(58) Field of Classification Search
CPC ............ H04B 10/07953; H04B 10/564; H04B 10/506; H04B 10/58; H04B 10/07955;
(Continued)

(56) References Cited

U.S. PATENT DOCUMENTS

| 6,714,740 B2 * | 3/2004 | Tajima ................. H04J 14/0221 398/16 |
| 6,868,200 B2 * | 3/2005 | Kimotsuki .............. H04J 14/02 385/24 |

(Continued)

FOREIGN PATENT DOCUMENTS

JP    2003046448    2/2003

OTHER PUBLICATIONS

"Amplified spontaneous emission," Wikipedia, https://en.wikipedia.org/wiki/Amplified_spontaneous_emission, pp. 1-3 (May 4, 2018).
(Continued)

*Primary Examiner* — Dibson J Sanchez
(74) *Attorney, Agent, or Firm* — Jenkins, Wilson, Taylor & Hunt, P.A.

(57) ABSTRACT

A method for determining a maximum transmission capacity, $TCAP_{MAX}$-OL, of an optical link, OL, within an optical network includes loading an optical transmission spectrum of the optical link, OL, being partially occupied by at least one data traffic carrying channel, CH, with amplified spontaneous emission, ASE, noise spectrally shaped such that the transmission performance of the optical transmission spectrum fully occupied with data traffic carrying channels, CHs, is matched. The method further includes determining the maximum transmission capacity, $TCAP_{MAX}$-OL, of the optical link, OL, on the basis of measured link data transported through the optical link, OL, via the at least one data traffic carrying channel, CH.

17 Claims, 12 Drawing Sheets

(51) Int. Cl.
*H04B 10/58* (2013.01)
*H04B 10/564* (2013.01)
*H04B 10/50* (2013.01)
*H04B 10/516* (2013.01)

(52) U.S. Cl.
CPC .......... *H04B 10/564* (2013.01); *H04B 10/58* (2013.01); *H04J 14/0212* (2013.01); *H04J 14/0221* (2013.01); *H04B 10/5161* (2013.01); *H04J 14/02* (2013.01); *H04J 14/026* (2013.01)

(58) Field of Classification Search
CPC .............. H04B 10/5161; H04J 14/0212; H04J 14/0221; H04J 14/026; H04J 14/02
USPC .......................... 398/9–38, 43–103, 182–201
See application file for complete search history.

(56) References Cited

U.S. PATENT DOCUMENTS

| | | | |
|---|---|---|---|
| 8,055,128 B2 | 11/2011 | Feldman | |
| 8,433,192 B2 | 4/2013 | Frankel et al. | |
| 8,886,055 B1* | 11/2014 | Morero | H04L 1/0041 398/192 |
| 9,509,412 B2* | 11/2016 | Tanaka | H04B 10/0799 |
| 9,755,777 B2* | 9/2017 | Bato | H04J 14/0221 |
| 10,404,366 B2* | 9/2019 | Satou | H04J 14/02 |
| 2001/0012146 A1* | 8/2001 | Shiozaki | H04B 10/296 359/337 |
| 2001/0053006 A1* | 12/2001 | Yoshida | H04J 14/0221 398/91 |
| 2002/0101652 A1* | 8/2002 | Hayashi | H01S 3/06754 359/341.4 |
| 2005/0024715 A1* | 2/2005 | Inoue | H04J 14/0221 359/337 |
| 2005/0152693 A1 | 7/2005 | Grand et al. | |
| 2005/0213980 A1* | 9/2005 | Ota | H04B 10/2918 398/84 |
| 2006/0051093 A1* | 3/2006 | Manna | H04B 10/296 398/79 |
| 2007/0230968 A1* | 10/2007 | Shimizu | H04B 10/506 398/177 |
| 2008/0080857 A1* | 4/2008 | Goto | H04B 10/07953 398/26 |
| 2008/0089700 A1* | 4/2008 | Takahashi | H04B 10/0779 398/208 |
| 2008/0137179 A1* | 6/2008 | Li | H01S 3/06754 359/337.13 |
| 2008/0304829 A1* | 12/2008 | Sato | H04J 14/0221 398/79 |
| 2008/0310858 A1* | 12/2008 | Lu | H04B 10/296 398/158 |
| 2009/0196602 A1* | 8/2009 | Saunders | H04B 10/5053 398/26 |
| 2010/0158532 A1* | 6/2010 | Goto | H04B 10/07955 398/81 |
| 2011/0222851 A1* | 9/2011 | Berg | H04J 14/0212 398/48 |
| 2012/0087658 A1* | 4/2012 | Jander | H04J 14/02 398/48 |
| 2012/0087661 A1* | 4/2012 | Look | H04B 10/6161 398/65 |
| 2012/0106968 A1* | 5/2012 | Nakamura | H04J 14/0212 398/79 |
| 2012/0163820 A1* | 6/2012 | Dangui | H04B 10/5161 398/79 |
| 2012/0201534 A1* | 8/2012 | Miyashita | H04B 10/25 398/34 |
| 2012/0243879 A1* | 9/2012 | Nashimoto | H04B 10/0799 398/140 |
| 2012/0251117 A1* | 10/2012 | Patel | H04J 14/0224 398/79 |
| 2013/0004166 A1* | 1/2013 | Okada | H04J 14/0221 398/34 |
| 2013/0022355 A1* | 1/2013 | Charlet | H04J 14/0257 398/48 |
| 2013/0058647 A1* | 3/2013 | Boertjes | H04B 10/0775 398/38 |
| 2014/0178071 A1 | 6/2014 | Zhang et al. | |
| 2014/0286635 A1* | 9/2014 | Kaneko | H04J 14/0221 398/34 |
| 2014/0314415 A1* | 10/2014 | Vassilieva | H04J 14/0227 398/76 |
| 2015/0043904 A1* | 2/2015 | Boduch | H04B 10/032 398/2 |
| 2015/0104186 A1 | 4/2015 | Zhang et al. | |
| 2015/0132009 A1* | 5/2015 | Yuki | H04J 14/0212 398/135 |
| 2016/0094304 A1 | 3/2016 | Butler | |
| 2016/0127037 A1 | 5/2016 | Cavaliere et al. | |
| 2016/0173202 A1 | 6/2016 | Kelly | |
| 2016/0241353 A1* | 8/2016 | Wright | H04J 14/0256 |
| 2017/0359142 A1* | 12/2017 | Tajima | H04B 10/27 |
| 2018/0069648 A1* | 3/2018 | Inada | H04B 10/073 |
| 2018/0212707 A1* | 7/2018 | Yamamoto | H04B 10/032 |
| 2018/0234749 A1* | 8/2018 | Chedore | H04Q 11/0005 |
| 2019/0052356 A1* | 2/2019 | Inoue | H04J 14/02 |
| 2019/0173578 A1* | 6/2019 | Smith | H04B 10/07953 |
| 2019/0253139 A1* | 8/2019 | Satou | H04B 10/07955 |
| 2019/0296851 A1* | 9/2019 | Jiang | H04B 10/07953 |

OTHER PUBLICATIONS

Richter et al, "Comparison of WDM Bandwidth Loading Using Individual Transponders, Shaped, and Flat ASE Noise," pp. 1-3 (2018).

Elson et al., Investigation of bandwidth loading in optical fibre transmission using amplified spontaneous emission noise, Optics Express, vol. 25, No. 16, pp. 1-9 (Aug. 7, 2017).

Elson et al., "High spectral density transmission emulation using amplified spontaneous emission noise," Optics Letters, vol. 41, No. 1, pp. 1-4 (Jan. 1, 2016).

Communication of the extended European search report for European Patent Application Serial No. 19192548.6 (dated Feb. 12, 2020).

Rahman et al., "Flexible Data-rate and Reach Transmission Employing Hybrid Modulation and Scrambled Coherent Superposition," 2017 European Conference on Optical Communication (ECOC), IEEE, pp. 1-2 (2017).

Gunkel et al., "Vendor-Interoperable Elastic Optical Interfaces: Standards, Experiments, and Challenges (Invited)," J. Opt. Commun. Netw., vol. 7, No. 12, pp. 1-5 (Dec. 2015).

* cited by examiner

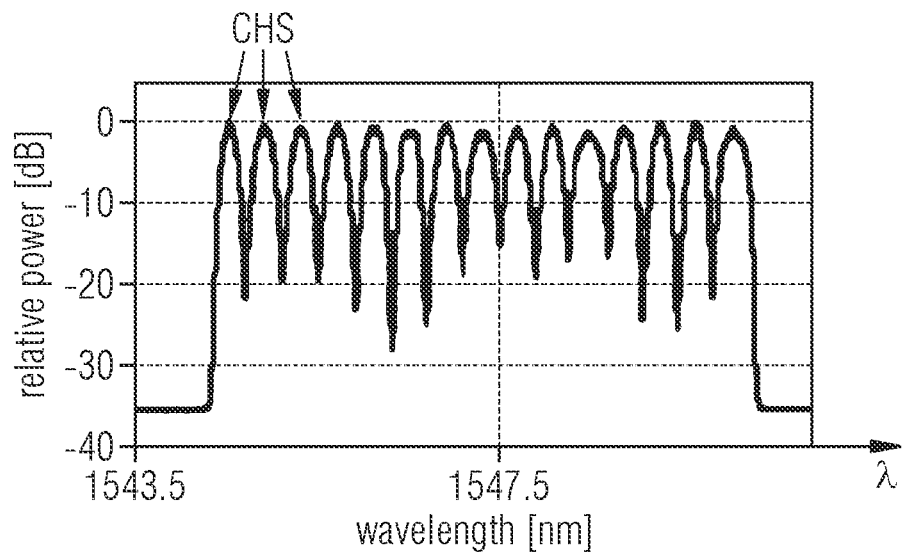
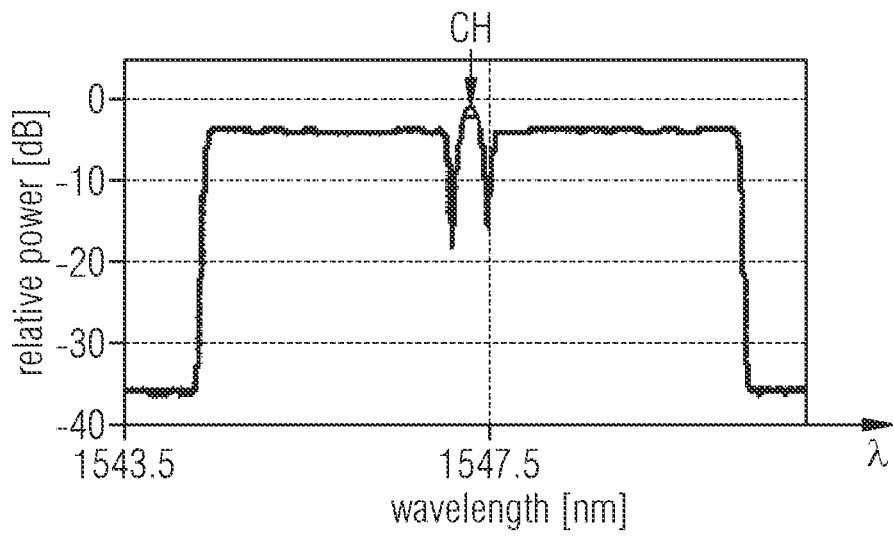

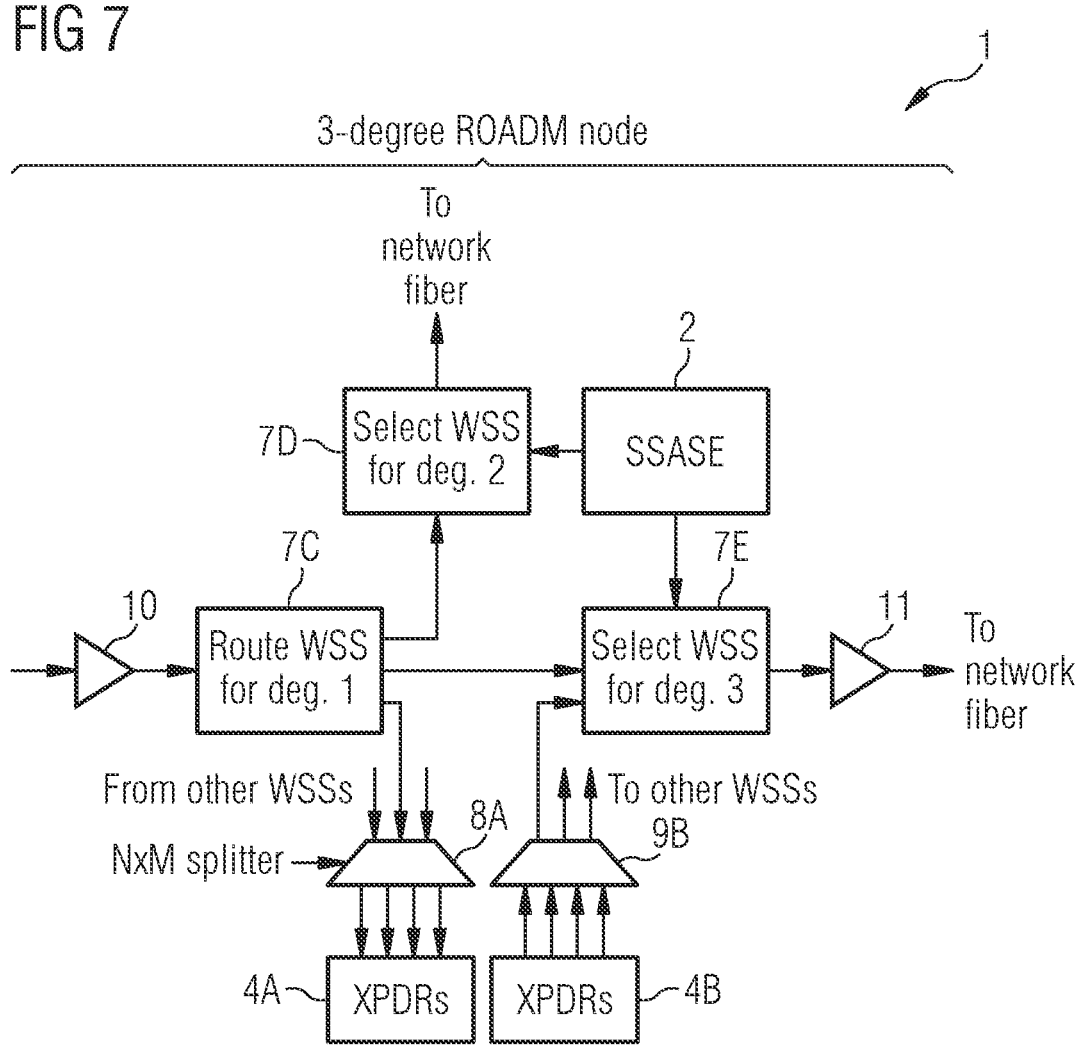

METHOD AND APPARATUS FOR DETERMINING A MAXIMUM TRANSMISSION CAPACITY WITHIN AN OPTICAL NETWORK

FIELD OF THE INVENTION

The invention relates to a method and an apparatus for determining a maximum transmission capacity of an optical link within an optical network, in particular within a wavelength division multiplexed, WDM, network.

TECHNICAL BACKGROUND

A conventional wavelength division multiplexed network can use specific software to determine key performance parameters of an optical network. These key performance parameters can comprise a maximum transmission capacity achievable between different locations, i.e. nodes of the optical network, or the available operating margin corresponding to a given capacity on a given optical link of the optical network. The maximum transmission capacity achievable between different locations of the network can, for instance, be represented by the sum of data rates carried by individual wavelengths each comprising a specific modulation format, a symbol rate as well as overhead for forward error correction FEC. The available operating margin on any given wavelength can be expressed as a difference between the required and available optical signal to noise ratio (OSNR), a signal to noise ratio (SNR), a Q factor or any other performance metric serving to define a margin of safety for the network operator to account for unforeseen degradations that can occur in the optical network during its operation, or to allocate a margin for future extensions of the optical network. Since different wavelengths transmitted through the optical network between the same two endpoints can have a different performance, there are usually different margins for different wavelengths.

Relevant parameters for designing the optical network are the characteristics of the optical fibers along each transmission route such as fiber loss between adjacent network nodes, fiber chromatic dispersion, effective area, and connector loss. Accurate knowledge of these parameters requires complex equipment and measurement methods and characterization efforts which are quite costly and time-consuming for WDM optical networks. Therefore, approximations can be used in the network planning phase and the resulting network capacity has a degree of uncertainty which can be high enough to generate one of two equally undesirable scenarios. The first scenario is that the estimated network capacity cannot be achieved due to worse fiber link parameters than assumed. The other undesirable scenario is that a higher capacity is achievable than in the planned design of the network. In this case, the network operator cannot maximize the use of the available resources. Network designers tend to use a conservative approach in the planning process to avoid the first undesirable scenario which leads to a higher likelihood of an optical network using less capacity than could be achieved. Another consequence is that the available margin in the optical network is unknown at the time of deployment of the optical network. Therefore, commercial optical networks may be either under-utilized, or may not support the eventual maximum transmission capacity assumed in the planning phase.

The uncertainty about the potential transmission capacity and available margin can be resolved at the time of deployment of the network if the available optical spectrum is filled with signals originating and terminating at flexible data rate transponders. As a basic unit of the DWDM system, a transponder has a client side and a network side, whereby one or several client signals received from a router or switch are multiplexed to higher data rates and converted to a WDM signal on the network side, capable of longer distance transmission than the client optics. Conversely, the line side received signal is demultiplexed and converted to a shorter-reach client signal facing the router or switch. The flexible data rate transponders can be set to various modulation formats, symbol rates, channel spacing and can measure a link performance, e.g. as a bit error ratio BER, or as signal to noise ratio, SNR. In this case, the major impairments incurred across the optical transmission link, particularly amplified spontaneous emission, ASE, noise and nonlinear noise are all present from the initial turn-up of the optical system and the approximate estimation of the maximum capacity derived from simulations or calculations can be replaced by actual measurements. The data rate can be adjusted independently on every wavelength. A channel spacing can be adjusted accordingly and a maximum capacity can be determined empirically. Similarly, an operating margin for a given data rate on a given wavelength can be determined using performance metrics.

However, in most applications, the network operator of the optical network does not need the complete transmission capacity at the time of initial deployment and may not provide real data rate transponders for the sole purpose of establishing a maximum attainable transmission capacity. This leaves the network operator of the optical network with an uncertainty with regard to the available capacity and available margin.

Accordingly, there is a need to provide a method and apparatus for determining a maximum transmission capacity within an optical network efficiently and with a minimum number of transponders.

SUMMARY OF THE INVENTION

The invention provides according to a first aspect a method for determining a maximum transmission capacity of an optical link within an optical network,
the method comprising the steps of:
loading an optical transmission spectrum of the optical link being partially occupied by at least one data traffic carrying channel with amplified spontaneous emission noise spectrally shaped such that a transmission performance of the optical transmission spectrum being fully occupied with data traffic carrying channels is matched and
determining the maximum transmission capacity of the optical link on the basis of measured link data transported through the optical link via the at least one data traffic carrying channel, CH.

In a possible embodiment of the method according to the first aspect of the present invention, the maximum transmission capacity of the optical link is determined as an aggregated data rate provided by the optical link on the basis of a data rate provided by the measured link data transported via the at least one data traffic carrying channel and on the basis of an aggregated bandwidth occupied by the respective data traffic carrying channels and a total bandwidth of the optical transmission spectrum of said optical link.

There are other possible implementations. In a possible implementation, the measured OSNR data across the full spectrum (including the ASE-occupied spectrum) provides spectrally-dependent OSNR information, which is used along with some general model information to determine the maximum capacity.

In a further possible embodiment of the method according to the first aspect of the present invention, the power spectral density of the amplified spontaneous emission noise is shaped to match the linear and nonlinear crosstalk performance of the optical transmission spectrum fully occupied with data traffic channels.

In a further possible embodiment of the method according to the first aspect of the present invention, if an additional data traffic carrying channel is added to the optical link by means of an optical multiplexing structure, the amplified spontaneous emission noise is blocked across a bandwidth occupied by said added data traffic carrying channel including or not including a guard frequency band.

In a still further possible embodiment of the method according to the first aspect of the present invention, the data traffic carrying channels are provided by transponders connected by means of an optical multiplexing structure to a near-end side of the optical link.

In a still further possible embodiment of the method according to the first aspect of the present invention, the amplified spontaneous emission noise is generated and spectrally shaped by an ASE noise module, SSASE, connected to the near-end side of the optical link by means of the optical multiplexing structure.

In a still further possible embodiment of the method according to the first aspect of the present invention, the amplified spontaneous emission, ASE, noise is generated by an ASE source of the ASE module, SSASE, and spectrally shaped by a flexible-grid capable wavelength selective switch, WSS, of the ASE noise module, SSASE, controlled by a controller of the ASE noise module, SSASE, according to parameters received by the controller or determined by the controller from input data carrying information about existing data traffic carrying channels, wherein said parameters comprise a power level, spectral bandwidths of the data traffic carrying channels and channel spacings between neighboring data traffic carrying channels.

In a further possible embodiment of the method according to the first aspect of the present invention, a transmission performance of the at least one data traffic carrying channel is measured on a far-end side of the optical link and comprises as performance metrics in particular a bit error ratio, BER, a signal to noise ratio, SNR, a Q factor, an error vector magnitude, EVM, and/or a generalized optical signal to noise ratio, GOSNR.

In a further possible embodiment of the method according to the first aspect of the present invention, an optical signal to noise ratio, OSNR, of the optical link, OL, is measured on a far-end side of the optical link, OL, in frequency bands occupied by the at least one available data traffic carrying channel, CH, and/or within ASE loaded frequency bands.

In a further possible embodiment of the method according to the first aspect of the present invention, one or more optical amplifiers and/or reconfigurable optical add-drop multiplexers, ROADM, of the optical link, OL, are tuned to achieve a target optimum launch power spectral density, PSD, of an optical signal launched into the near-end side of the optical link, OL, using measured link data transported through the optical link, OL, via the at least one available data traffic carrying channel, CH.

In a further possible embodiment of the method according to the first aspect of the present invention, an operation margin, OM, of the at least one available data traffic carrying channel, CH, is determined as a difference calculated between the transmission performance, TPER, of the data traffic carrying channel, CH, measured on the far-end side of the optical link, OL, and a predetermined transmission performance threshold, TPER-TH, for error-free transmission provided by a model.

In a still further possible embodiment of the method according to the first aspect of the present invention, a data rate DR, of the at least one available data traffic carrying channel, CH, is adjusted depending on the determined operation margin, OM, of the data traffic carrying channel, CH, to maximize a transmission capacity, TCAP-CH, of the respective data traffic carrying channel, CH.

In a still further possible embodiment of the method according to the first aspect of the present invention, the data rate, DR, of the at least one available data traffic carrying channel, CH, is adjusted through a change of a symbol rate and/or through a change of a modulation format provided by transponders connected to the near-end side of the optical link, OL.

In a still further possible embodiment of the method according to the first aspect of the present invention, the maximum transmission capacity, $TCAP_{MAX}$-OL, of the optical link, OL, is determined as an aggregated data rate, DR, provided by the optical link, OL, after the transmission capacity, TCAP-CH, of the available data traffic carrying channels, CHs, has been maximized.

In a further possible embodiment of the method according to a first aspect of the present invention, the optical transmission network, OTN, comprises a wavelength division multiplexed, WDM, network comprising data traffic carrying channels, CHs, having allocated carrier frequencies.

The invention further provides according to a further aspect a network node of an optical transmission network, said network node comprising an amplified spontaneous emission, ASE, noise module, SSASE, adapted to provide an amplified spontaneous emission, ASE, noise spectrally shaped such that a transmission performance of the optical transmission spectrum, OPT-SPEC, provided by the optical links, OL, of said optical transmission network being fully occupied with data traffic carrying channels, CHs, is matched.

In a possible embodiment of the network node according to the second aspect of the present invention, the network node comprises an optical multiplexing structure adapted to combine the spectrally shaped amplified spontaneous emission, ASE, noise provided by the amplified spontaneous emission, ASE, noise module, SSASE, of said network node with wavelengths of data traffic carrying channels, CHs.

In a further possible embodiment of the network node according to the second aspect of the present invention, the optical multiplexing structure of the optical network node comprises a reconfigurable optical add-drop multiplexer, ROADM.

In a still further possible embodiment of the network node according to the second aspect of the present invention, the amplified spontaneous emission, ASE, noise module, SSASE, comprises:

an amplified spontaneous emission, ASE, noise source adapted to generate an amplified spontaneous emission, ASE, noise and a wavelength selective switch, WSS, adapted to spectrally shape the generated amplified spontaneous emission, ASE, noise.

In a further possible embodiment of the network node according to the second aspect of the present invention, the network node further comprises a controller adapted to control the wavelength selective switch, WSS, according to parameters received by the controller or determined by the controller from input data carrying information about existing data traffic carrying channels, CHs.

The invention further provides according to a further aspect an optical network comprising a plurality of network nodes according to the second aspect of the present invention. This optical network can comprise a point-to-point optical network, a ring optical network, or a meshed optical network.

BRIEF DESCRIPTION OF FIGURES

In the following, possible embodiments of the different aspects of the present invention are described in more detail with reference to the enclosed figures.

FIGS. 4A, 4B, 4C show diagrams for illustrating the operation of a method and apparatus according to a possible embodiment of the present invention;

FIG. 7 shows a further possible exemplary embodiment of a method and apparatus according to the present invention;

DETAILED DESCRIPTION OF EMBODIMENTS

Figure 1:
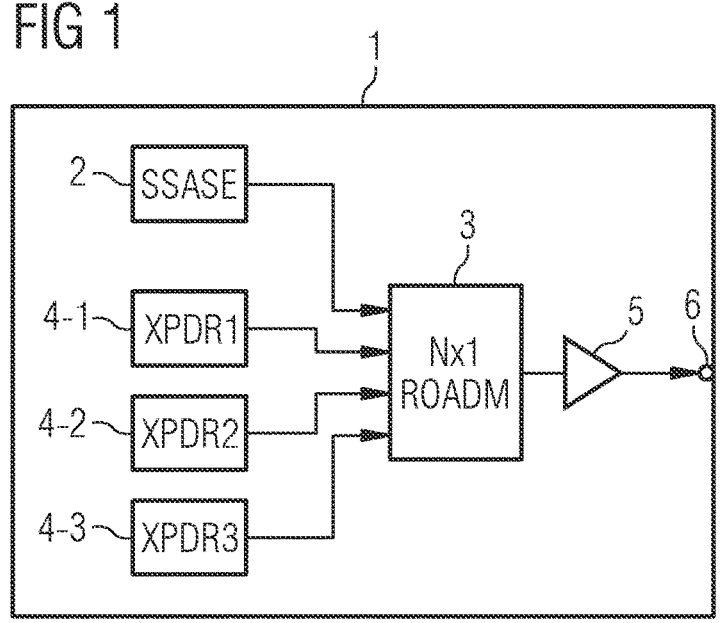
FIG. 1 shows a block diagram of a possible exemplary embodiment of a network node according to an aspect of the present invention.

FIG. 1 illustrates a possible exemplary embodiment of a network node 1 of an optical transmission network. In the illustrated exemplary embodiment, the network node 1 comprises at least one amplified spontaneous emission, ASE, noise module (SSASE) 2. The amplified spontaneous emission, ASE, noise module 2 is adapted to provide an amplified spontaneous emission, ASE, noise spectrally shaped such that a transmission performance of an optical transmission spectrum, OPT-SPEC, provided by optical links, OL, of said optical transmission network being fully occupied with data traffic carrying channels, CHs, is matched. The amplified spontaneous emission, ASE, noise module 2 of the network node 1 as illustrated in FIG. 1 is connected to an optical multiplexing structure 3 adapted to combine the spectrally shaped amplified spontaneous emission, ASE, noise provided by the amplified spontaneous emission, ASE, noise module (SSASE) 2 of the network node 1 with wavelengths of data traffic carrying channels, CHs. In the illustrated exemplary embodiment of FIG. 1, the optical multiplexing structure 3 is formed by a reconfigurable optical add-drop multiplexer, ROADM. The optical multiplexing structure 3 which is used to combine traffic carrying wavelengths which can originate at the same network node 1 can comprise e.g. an N×1 ROADM, however, other implementations of the optical multiplexing structure 3 are possible including e.g. passive couplers and/or a combination of passive couplers and wavelength blockers. In the illustrated exemplary embodiment of FIG. 1, the network node comprises several transponders 4-1, 4-2, 4-3 connected to the optical multiplexing structure 3 formed by the N×1 ROADM. The term transponder can be equivalently used with the more general term transceiver. The transponder or transceiver 4 is a module which transmits and receives data traffic over the optical network. The optical network node 1 shown in FIG. 1 refers to a single network location where optical equipment is located including, but not limited to the transceivers 4-$i$ of the optical multiplexing structure 3 and/or an optical amplifier 5 as illustrated in FIG. 1. In the illustrated exemplary embodiment of FIG. 1, the optical network node 1 comprises a signal output 6 connected to the near-end side of an optical link OL. The network node 1 can comprise a terminal network node or an intermediate network node. The terminal network node is a network node at which all data traffic is terminated (added/dropped) at transceivers or transponders, i.e. no data traffic passes through the terminal network node to be terminated by another network node. In contrast, an intermediate network node can comprise some data traffic that is added/dropped (terminated) but also some data traffic that is optically routed, i.e. passed through to the next network node in the optical network. The reconfigurable optical add-drop multiplexer ROADM can perform optical routing functions such as passing through, add-drop with two or more degrees. The reconfigurable optical add-drop multiplexer 3 illustrated in the embodiment of FIG. 1 forms a functional unit or module which can in a possible implementation multiplex, demultiplex, route and control the optical spectrum at the network node 1.

Figure 2:
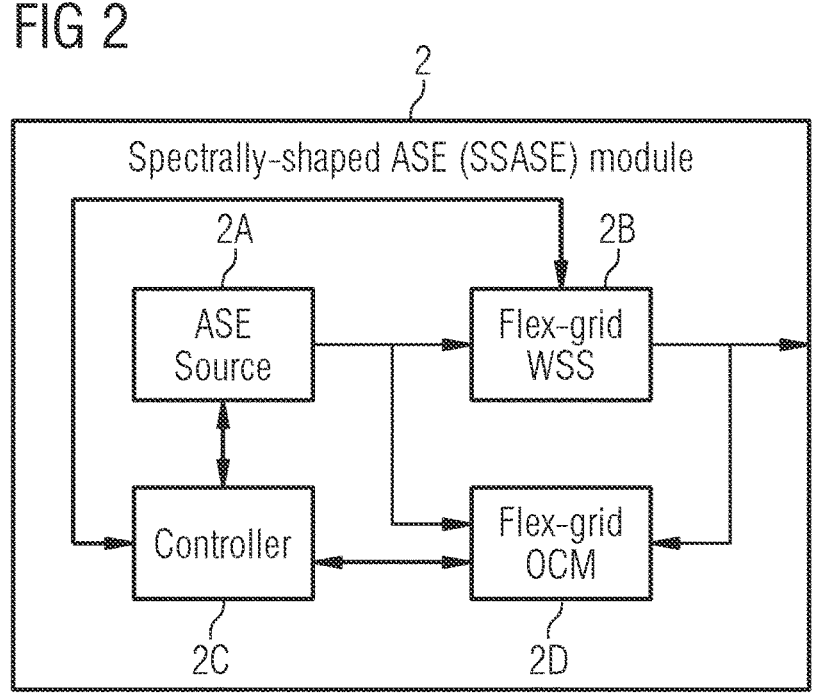
FIG. 2 shows a block diagram of a possible exemplary implementation of a spectrally-shaped amplified spontaneous emission, ASE, noise module, SSASE, of a network node according to the first aspect of the present invention.

The amplified spontaneous emission, ASE, noise module (SSASE) 2 within the network node 1 as illustrated in the embodiment of FIG. 1 is shown in more detail in the block diagram of FIG. 2. In the illustrated embodiment of FIG. 2, the amplified spontaneous emission, ASE, noise module (SSASE) 2 comprises an amplified spontaneous emission, ASE, noise source 2A adapted to generate an amplified spontaneous emission, ASE, noise. The amplified spontaneous emission, ASE, noise module (SSASE) 2 further comprises a wavelength selective switch, WSS, 2B adapted to spectrally shape the amplified spontaneous emission, ASE, noise generated by the amplified spontaneous emission, ASE, noise source 2A. The wavelength selective switch, WSS, 2B comprises in a preferred embodiment a flexible-grid capable wavelength selective switch. The wavelength selective switch 2B is capable of wavelength dependent control of multiple optical signals, including blocking, passing or attenuating individual wavelength components for spectral regions and can be further adapted to optionally route different traffic to or from multiple input/output ports. Different technologies can be employed to form the wavelength selective switch WSS including e.g. liquid crystal on silicon (LCoS) or microelectromechanical systems (MEMS). In the illustrated embodiment of FIG. 2, the flexible-grid wavelength selective switch 2B of the amplified spontaneous emission, ASE, noise module (SSASE) 2 is connected to a controller 2C. The controller 2C of the amplified spontaneous emission, ASE, noise module 2 is adapted to control the wavelength selective switch (WSS) 2B according to shaping and/or blocking parameters. In a possible embodiment, the parameters are received by the local controller 2C of the amplified spontaneous emission, ASE, noise module 2 from another entity of the optical network. In an alternative embodiment, the controller 2C of the amplified spontaneous emission, ASE, noise module 2 is capable of determining the parameters from input data carrying information about existing data traffic carrying channels CHs. The provision of a wavelength selective switch (WSS) with a flexible-grid operation capability forms a preferred embodiment which can offer a best performance and flexibility. In an alternative embodiment, a flexible-grid ROADM provided in the optical multiplexing structure 3 can also be used to achieve the appropriate shaping and blocking of the amplified spontaneous emission, ASE, noise generated by the ASE source 2A.

The amplified spontaneous emission, ASE, noise module (SSASE) 2 illustrated in the embodiment of FIG. 2 further comprises a flexible-grid optical channel monitor (OCM) 2D connected to the flexible-grid capable wavelength selective switch (WSS) 2B and communicating with the controller 2C as shown in FIG. 2. In a possible embodiment, the flexible-grid WSS 2B, the flexible-grid OCM and the controller 2C can also be integrated in an existing optical multiplexing structure and may perform the necessary ASE loading control functions. The controller 2C requires some input information about the existing traffic carrying channels CHs of the optical transport network. This information can come from different information sources. These information sources can comprise for instance another piece of equipment within the optical network, e.g. a multiplexing ROADM. The information may also come directly from the transceivers 4-$i$ or from some higher layer network control software. Further, the amount of direct control intelligence performed by the controller 2C of the amplified spontaneous emission, ASE, noise module (SSASE) 2 can vary in different embodiments. In a possible embodiment, the amplified spontaneous emission, ASE, noise module 2 can receive the input data from another entity of the optical network and can independently determine the required ASE shaping and/or blocking parameters to be applied to the flexible-grid wavelength selective switch 2B for performing the spectral shaping of the amplified spontaneous emission, ASE, noise generated by the ASE source 2A. In an alternative embodiment, the amplified spontaneous emission, ASE, noise module (SSASE) 2 can receive complete instructions on how to shape and block the amplified spontaneous emission, ASE, from an external controller software and applies these instructions to the associated hardware in the amplified spontaneous emission, ASE, noise module (SSASE) 2. The flexible-grid operation in this context is defined to mean that the available multiplexing structures and wavelength control can be configured to arbitrary channel bandwidths and spacings beside conventional fixed frequency grids.

The amplified spontaneous emission, ASE, noise module (SSASE) can be used to fill the available optical spectrum such that the transmission performance of an optical transmission spectrum fully occupied with data traffic carrying channel CHs is matched. Thus, the conditions and optical impairments from a fully-filled optical spectrum are present and the network operator of the optical network can plan for a maximum capacity with a much higher degree of confidence and much less margin. An additional benefit of this configuration is that the optical power levels are kept stable by fully-loading the optical spectrum and consequently, the optical signal to noise ratio OSNR is constant in time, and amplifier channel power ripple as well as spectral tilt do not change over the operation lifetime of the optical system with regard to the channel load. When new optical channels are added to the optical network, the amplified spontaneous emission, ASE, in the corresponding spectral region is blocked.

The amplified spontaneous emission, ASE, noise module (SSASE) 2 controls the ASE loading in order to closely match linear and nonlinear effects caused by data traffic channels CHs. The power spectral density, PSD, of the amplified spontaneous emission, ASE, noise is shaped by the amplified spontaneous emission, ASE, noise module (SSASE) 2 to emulate to the linear and nonlinear crosstalk performance of the optical transmission spectrum OPT-SPEC fully occupied with data traffic channels, CHs. The SSASE module 2 can control the ASE loading in order to closely match the linear and nonlinear effects from the data channels with an ASE stop-bandwidth value within an adequate spectral range and corresponding integrated ASE power level, and can avoid other linear impairments such as crosstalk or filtering effects at add-drop (ROADM) nodes. This specialized control of the ASE loading spectrum allows the optical network OTN to operate from day one with near-identical performance to an optical network being fully-filled with data traffic channels CHs. This in turn allows for a procedure to estimate the total available capacity on a given optical link OL using the method according to the present invention.

Figure 3:
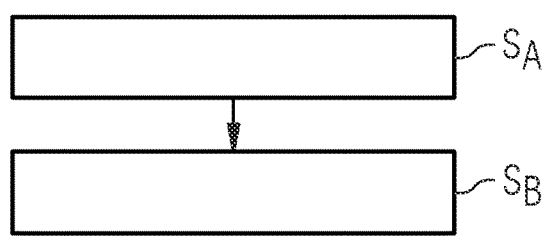
FIG. 3 shows a flowchart of a possible exemplary embodiment of a method for determining a maximum transmission capacity of an optical link within an optical network according to a further aspect of the present invention.

FIG. 3 illustrates a flowchart of a possible exemplary embodiment of a method for determining a maximum transmission capacity of an optical link, OL, within an optical transport network OTN according to a further aspect of the present invention.

As can be seen in the flowchart of FIG. 3, the method according to the further aspect of the present invention comprises in the illustrated exemplary embodiment two main steps SA, SB. In a first step SA, an optical transmission spectrum of the optical link, OL, being partially occupied by at least one data traffic carrying channel, CH, is loaded with amplified spontaneous emission, ASE, noise spectrally shaped such that the transmission performance of an optical transmission spectrum OPT-SPEC fully occupied with data traffic carrying channels, CHs, is matched. The loading of the optical transmission spectrum of the optical link OL can be performed in the first step SA in a possible implementation using an amplified spontaneous emission, ASE, noise module 2 as illustrated in FIG. 2.

In a further step SB, the maximum transmission capacity, $TCAP_{MAX}$-OL, of the optical link, OL, is determined on the basis of measured link data transported through the optical link, OL, via the at least one data traffic carrying channel, CH.

In a possible embodiment of the method according to the present invention as illustrated in FIG. 3, the maximum transmission capacity, $TCAP_{MAX}$-OL, of the optical link, OL, is determined in the second step SB as an aggregated data rate, DR, provided by the optical link, OL, on the basis of a data rate, DR, provided by the measured link data transported via the at least one data traffic carrying channel, CH, and on the basis of a relationship, such as a ratio between an aggregated bandwidth, BW-CH, occupied by the respective data traffic carrying channels, CHs, and a total bandwidth, BW-OPT-SPEC, of the optical transmission spectrum, OPT-SPEC, of the optical link, OL.

In a possible embodiment of the method for determining a maximum transmission capacity, $TCAP_{MAX}$-OL, of an optical link, OL, within an optical network, the power spectral density, PSD, of the amplified spontaneous emission, ASE, is shaped in step SA to match the linear and non-linear crosstalk performance of an optical transmission spectrum, OPT-SPEC, fully occupied with data traffic channels, CHs. The data traffic carrying channels, CHs, can be provided by transponders or transceivers connected by means of an optical multiplexing structure 3 to a near-end side of the optical link, OL. The amplified spontaneous emission, ASE, noise is generated and spectrally-shaped in a possible embodiment by an ASE noise module 2 connected also to the near-end side of the optical link, OL, by means of the optical multiplexing structure 3 of the respective node. The amplified spontaneous emission, ASE, noise can be generated by an ASE source of the ASE module 2 such as illustrated in FIG. 2 and can be spectrally shaped by a flexible-grid capable wavelength selective switch, WSS, 2B of the ASE module 2 as illustrated in the block diagram of FIG. 2. The flexible-grid capable wavelength selective switch 2B can be controlled in a possible implementation by a controller 2C of the ASE noise module 2 according to shaping parameters. These shaping parameters are either received by the controller 2C from other entities of the optical transport network OTN or determined by the controller 2C itself from received input data carrying information about existing data traffic carrying channels, CHs. The shaping parameters can comprise in a possible embodiment power levels, spectral bandwidth of the data traffic carrying channels, CHs, as well as channel spacings between neighboring data traffic carrying channels, CHs.

In a possible embodiment some data, i.e. empirical, theoretical or simulated data, is provided to predetermine the WSS shaping settings, for the given information received by SSASE controller 2C about the existing data traffic carrying channels, CHs.

In a possible embodiment of the method as illustrated in FIG. 3, a transmission performance, TPER, of at least one data traffic carrying channel, CH, can be measured in the second step SB on a far-end side of the optical link, OL. The transmission performance, TPER, can comprise different performance metrics such as a bit error ratio, BER, a signal to noise ratio, SNR, a Q factor, an error vector magnitude, EVM, and/or a generalized optical signal to noise ratio, GOSNR. The optical signal to noise ratio, OSNR, of the optical link, OL, can be measured in a possible embodiment on a far-end side of the optical link, OL, in frequency bands occupied by the at least one available data traffic carrying channel, CH, and/or within ASE loaded frequency bands. In a possible embodiment, one or more optical amplifiers and/or reconfigurable optical add-drop multiplexers, ROADM, of the optical link, OL, can be tuned to achieve a target optimal launch power spectral density, PSD, of an optical signal launched into the near-end side of the optical link, OL, using measured link data transported through the optical link, OL, via the at least one available data traffic carrying channel, CH.

In a possible embodiment of the method as illustrated in FIG. 3, an operation margin, OM, of the at least one available data traffic carrying channel, CH, can be determined as a difference calculated between the transmission performance, TPER, of the data traffic carrying channel, CH, measured on the far-end side of the optical link, OL, and a predetermined transmission performance threshold, TPER-TH, for an error-free transmission provided by a model. This model can comprise a theoretical or empirical model to determine the operation margin, OM. This model provides a reference point to determine the operation margin, OM, from the measured link data. The model can comprise a theoretical or empirical data model of a baseline transceiver performance.

In a possible embodiment of the method according to the present invention, a data rate, DR, of the at least one available data traffic carrying channel, CH, can be adjusted depending on the determined operation margin, OM, of the data traffic carrying channel, CH, to maximize a transmission capacity, TCAP-CH, of the respective data traffic carrying channel, CH. In a possible embodiment, the data rate, DR, of the at least one available data traffic carrying channel, CH, is adjusted through a change of a symbol rate and/or through a change of a modulation format provided by transponders or transceivers 4 connected to the near-end side of the optical link, OL.

After the transmission capacity, TCAP-CH, of the available data traffic carrying channels, CHs, has been maximized, the maximum transmission capacity, $TCAP_{MAX}$-OL, of the optical link, OL, is determined as an aggregated data rate, DR, provided by the optical link, OL. The method according to the present invention as illustrated in the flow chart of FIG. 3 is capable of determining a maximum transmission capacity, $TCAP_{MAX}$-OL, of an optical link, OL, within an optical transport network, OTN. The optical transmission network OTN can comprise a wavelength division multiplexed, WDM, network, in particular a DWDM network. The WDM network comprises data traffic carrying channels, CHs, having allocated carrier frequencies. The optical transport network, OTN, can comprise a point-to-point optical network or a meshed optical network.

Figure 4C:
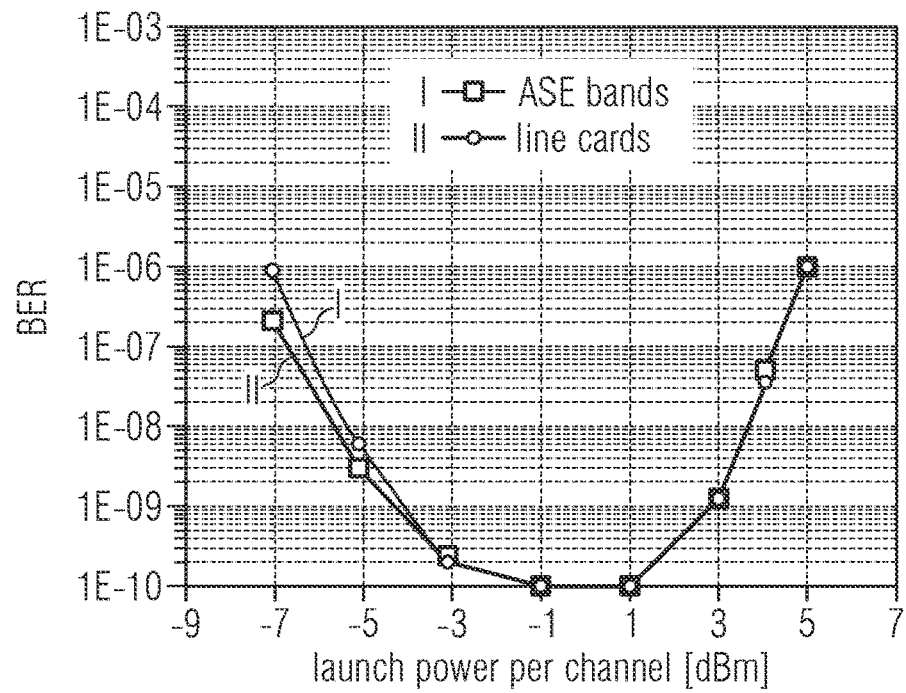

It is known that in dispersion-uncompensated optical systems, signals become highly dispersed and can thus resemble Gaussian noise. However, the actual performance comparison between nonlinear effects due to modulated data channels and ASE spectral loading has not been shown until relative recently. As illustrated in FIGS. 4A, 4B, 4C, ASE frequency bands with appropriate bandwidths and integrated power can serve as a close approximation of the nonlinear effects due to modulated data channels.

FIG. 4B illustrates the filling of the spectrum with loaded ASE noise around a channel CH. This is only a simple example. It is e.g. also possible to fill gaps between channels CHs with ASE noise.

FIG. 4A illustrates the relative power of traffic carrying data channels CHs and FIG. 4B illustrates the approximation by ASE noise around a data traffic channel CH. FIGS. 4A, 4B, 4C describe a nonlinearity comparison between the modulated data traffic channels CHs and the ASE frequency bands. As can be seen in FIG. 4C, the bit error ratio, BER, provided by the loaded ASE noise (curve I) approximates the bit error BER of data traffic carrying channels CHs of line cards or transponders (curve II).

Figure 5:
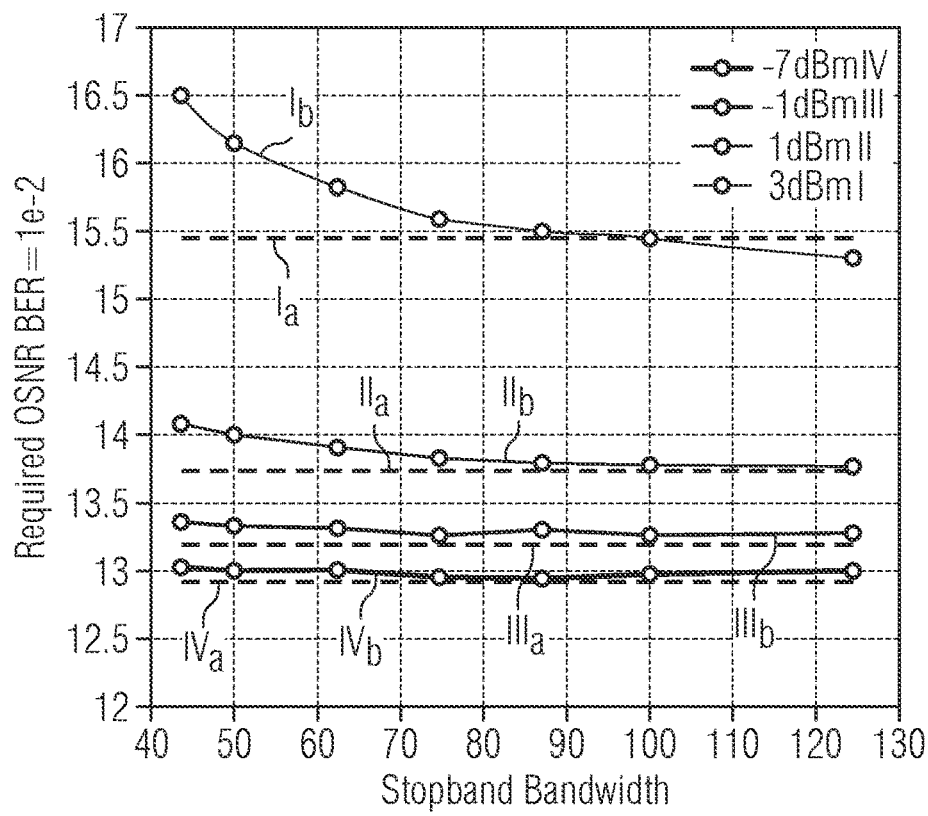
FIG. 5 shows a further diagram for illustrating the operation of a method and apparatus according to the present invention.

FIG. 5 illustrates the dependence of performance matching between modulated data traffic channels, CHs, and ASE frequency bands on the stop-bandwidth for the shaped ASE frequency bands (simulation results). A key element in the replication of realistic nonlinear instructions is the stopband of the ASE frequency regions around the modulated data traffic channels CHs. FIG. 5 shows a simulation result for 34 Gbaud PM-QPSK over seven optical spans OLS of True-Wave-RS fibers. The dashed curves Ia, IIa, IIIa, Iva represent the performance with real data channel neighbors, whereas the solid curves Ib, IIb, IIIb, IVb represent the performance with shaped ASE noise bands on either side, wherein each curve represents a different per channel launch power into each fiber span. As can be seen from FIG. 5, the stopband bandwidth of the ASE loading frequency bands has an impact on matching the linear and nonlinear performance of the ASE loaded optical system with a real traffic filled system. Significantly, this optical ASE stopband bandwidth is not dependent on the amount of fiber nonlinearity. Consequently, it is generally applicable to all fiber types and launch powers but requires to be scaled with the symbol rate and frequency spacing between data traffic channels CHs. By choosing the proper WSS pass-stopband settings for the amplified spontaneous emission, ASE, noise module (SSASE) 2 it can ensured that the ASE loading technique can be used to accurately determine the maximum transmission capacity. If the stopband is too narrow, an enhanced crosstalk and nonlinearity degrades the signal performance beyond the expected performance with real data traffic channels. In contrast, if the stopband is too wide, the required ASE power in the more limited spectral range could be higher than the power spectral density, PSD, available from the ASE noise source. Furthermore, the nonlinear effects thus generated may not match the case of co-propagating data signals. The determination of the ASE stopbands can be performed using empirical results, i.e. computer simulations or experimental measurements or analytical formulas (e.g. the Gaussian noise model) in order to derive the equivalent nonlinear effects with ASE loading as in a system fully loaded with data traffic channels CHs. The model for determining the proper WSS stopband applied to the amplified spontaneous emission, ASE, noise module (SSASE) 2 can depend on the specific stopband shape and isolation of the WSS device which may vary based on the vendor and/or the used WSS technology, e.g., liquid crystal on silicon (LCoS) or microelectromechanical systems (MEMS) technology. The WSS stopband model can also depend on the add-drop node architecture, e.g. how many WSS modules are present in the signal path. The method and apparatus according to the present invention ensure that any spectral regions not filled with traffic carrying data channels CHs are instead filled with ASE noise. The ASE used to fill the available optical spectrum should have an appropriate power spectral density, PSD, such that the interactions with the data traffic channels CHs, in particular DWDM channels, emulate a system or optical network fully filled with real data traffic. The method and apparatus according to the present invention is especially beneficial in optical networks with Nyquist-shaped signals and a wide range of available transceiver symbol rates and modulation formats as will be available in many current and next generation bandwidth variable transceivers. The proposed DWDM system or network includes amplified spontaneous emission, ASE, noise modules 2 at some or all nodes with add-drop capability, e.g. ROADM nodes with route-and-select architecture.

The optical network OTN can comprise different configurations and topologies.

Figure 6A:
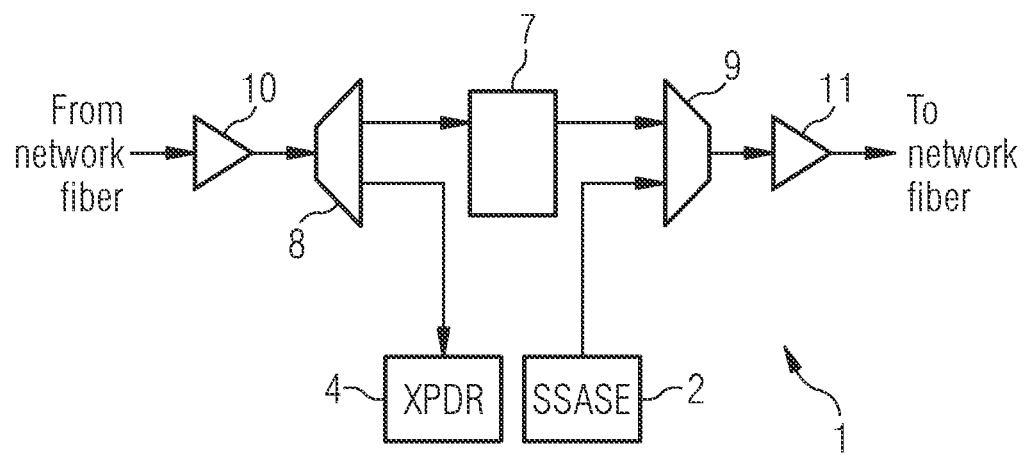
FIGS. 6A, 6B illustrate possible exemplary embodiments of a method and apparatus according to the present invention.
Figure 6B:
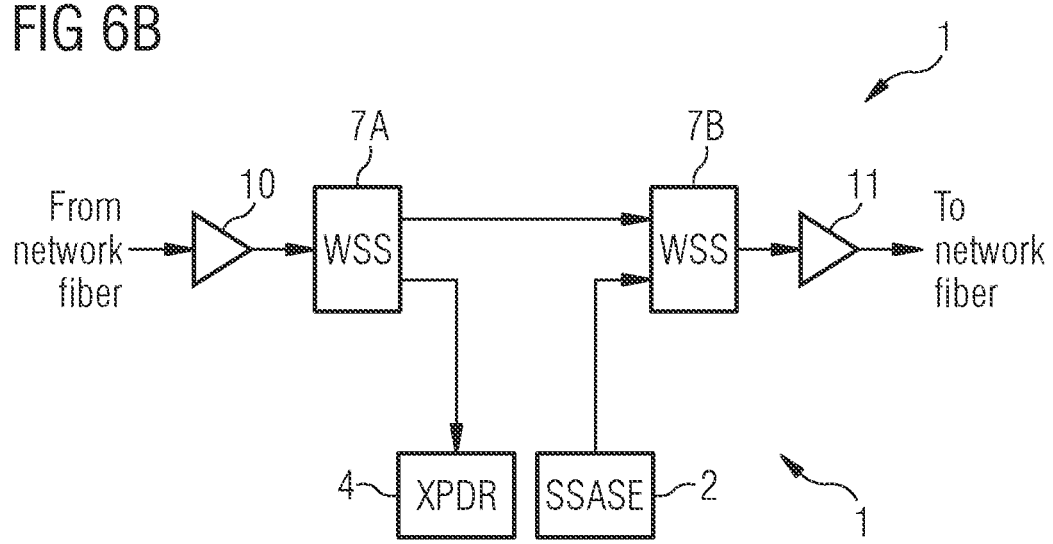

FIGS. 6A, 6B illustrate two possible exemplary embodiments of an add-drop network node where some data traffic is dropped (terminated) and new data traffic or noise is added to the traffic which continues to the next network node of the optical network OTN. In the illustrated exemplary embodiment of FIG. 6A, the network node 1 comprises a single WSS module 7. The network node 1 further comprises a power splitter 8 and a power combiner 9 used for adding and/or dropping any data traffic channels CHs and/or SSASE loading. In the illustrated exemplary embodiment of FIG. 6A, the network node 1 is comprised of an optical amplifier 10 on the receiving side and an optical amplifier 11 on the transmitting side. In the illustrated embodiment of FIG. 6A, the amplified spontaneous emission, ASE, noise module (SSASE) 2 includes a wavelength selective switch, WSS, to properly shape and/or block the ASE noise provided by an internal ASE noise source because in the illustrated embodiment of FIG. 6A, the output of the SSASE module 2 is passively combined by the power combiner 9 with the data traffic channels CHs, i.e. no additional blocking or shaping is performed. Consequently, a channel received from the network fiber through amplifier 10 and detected at transponder (XPDR) 4 needs to be blocked at WSS 7, and the spectrum previously occupied by channel terminated at XPDR 4 needs to be filled with spectrally-shaped ASE from module SSASE 2.

In contrast, in the alternative embodiment illustrated in FIG. 6B, the network node 1 comprises a more conventional route-and-select ROADM architecture with two wavelength selective switch (WSS) units 7A, 7B at the ingress and egress of the add-drop node 1. This provides the option to drop blocked existing traffic channels and/or ASE noise and to add new traffic channels and/or ASE. In the configuration illustrated in FIG. 6B, the SSASE module 2 is not strictly required to contain a wavelength selective switch, WSS, to apply spectral shaping to the ASE since the shaping can potentially be performed by the second WSS unit 7B shown in FIG. 6B. For the sake of simplicity, the block diagrams illustrated in FIGS. 6A, 6B illustrate only a single direction of propagation. In general, the network node 1 can also comprise at least two directions of propagation with equivalent components and structures for bidirectional traffic throughout the optical network OTN.

FIG. 7 shows a further block diagram of a further possible exemplary embodiment of a network node 1 having an SSASE module 2. FIG. 7 illustrates a multi-degree add-drop node structure with SSASE loading. The node 1 comprises more than two degrees or directions to which data traffic can be directed. The network node 1 shown in FIG. 7 comprises a route WSS 7C for degree 1, a select WSS 7D for degree 2 and a select WSS 7E for degree 3. A plurality of transponders or transceivers 4A, 4B are connected to the WSS 7C, 7E by means of N×M splitters 8A or combiners 9B. In the illustrated embodiment of FIG. 7, the amplified spontaneous emission, ASE, noise shaped by the SSASE module 2 can be added to multiple ROADM degrees. In other embodiments, the N×M splitters 8A or combiners 9B can be replaced by various combinations of wavelength-selective switches (WSS), wavelength-independent (white/broadband-light) optical switches, passive couplers, optical filters, and amplifiers to implement features such as colorless, directionless, and/or contentionless ROADM functionality.

Figure 8A:
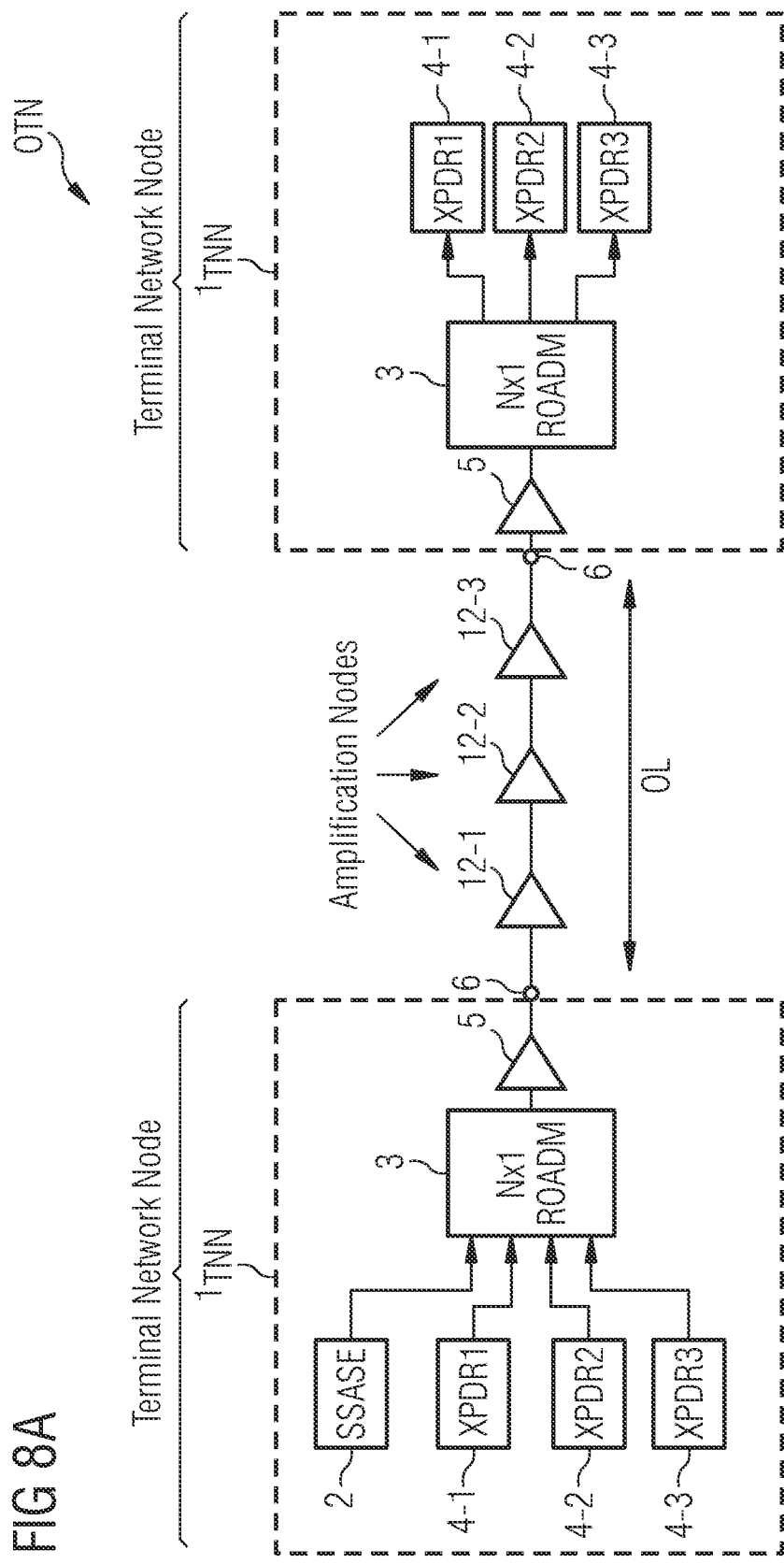
FIGS. 8A, 8B show further exemplary embodiments of a method and apparatus according to the present invention.
Figure 8B:
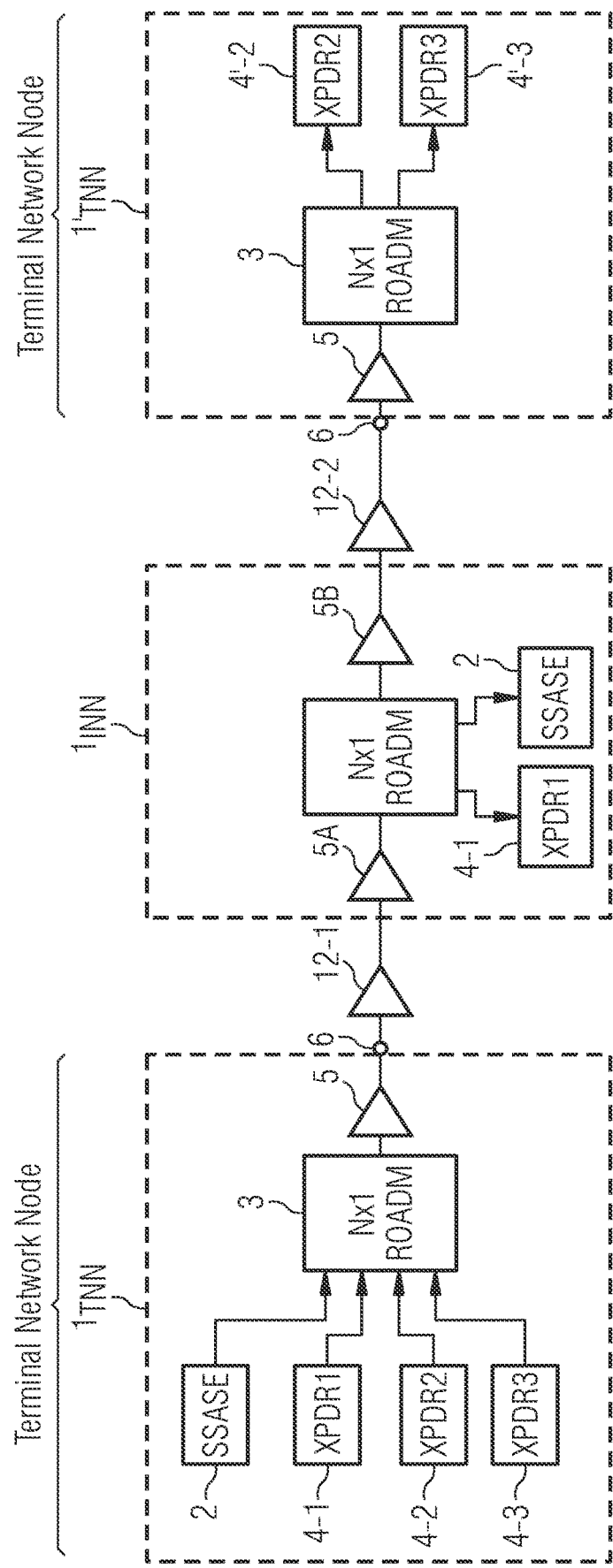

The SSASE loading of amplified spontaneous emission, ASE, noise can be applied in a possible embodiment to point-to-point optical links, OL, as illustrated in FIGS. 8A and 8B but also to a meshed optical network with multi-degree ROADMs and many possible traffic routes. FIG. 8A illustrates a linear point-to-point optical system OTN with only two terminal network nodes $1_{TNN}$, $1'_{TNN}$ at the endpoints and with no intermediate add-drop network nodes. In the illustrated embodiment of FIG. 8A, the terminal optical network node $1_{TNN}$, $1'_{TNN}$ have the structure of the optical network node 1 illustrated in FIG. 1 comprising a SSASE module 2, several transceivers 4 and an N×1 ROADM 3 connected to an optical amplifier 5. On the receiving side, the second terminal network node $1'_{TNN}$ on the far end side also comprises an amplifier 5, an N×1 ROADM 3 and several transceivers 4-1, 4-2, 4-3. Between the two terminal network nodes $1_{TNN}$, $1'_{TNN}$, one or more amplification network nodes with optical amplifiers 12-1, 12-2, 12-3 can be provided. The optical link OL connecting to terminal network nodes $1_{TNN}$, $1'_{TNN}$ provides a point-to-point connection as shown in FIG. 8A. The second terminal network node $1'_{TNN}$ can also comprise in a possible embodiment an SSASE module 2 for traffic transmitted in the opposite direction (from $1'_{TNN}$ to $1'_{TNN}$).

FIG. 8B illustrates a point-to-point system with two terminal network nodes $1_{TNN}$, $1'_{TNN}$ but also comprising at least one intermediate network node $1_{INN}$ with passthrough and add-drop data traffic. The intermediate network node $1_{INN}$ also comprises an SSASE module 2 and a transceiver 4. The optical link connects the first terminal node $1_{TNN}$ with the second terminal network node $1'_{TNN}$ via the intermediate network node $1_{INN}$ by means of two fiber spans as shown in FIG. 8B. Optical amplifiers can be provided within different network nodes or in separate amplification network nodes as illustrated in FIG. 8B. In the illustrated example of FIG. 8B, the intermediate network node $1_{INN}$ comprises the receiving side and on the output side an optical amplifier 5A, 5B. Further, separate amplification nodes 12-1, 12-2 are provided for amplification of the optical signal propagating through the optical fibers of the optical link OL.

Figure 9:
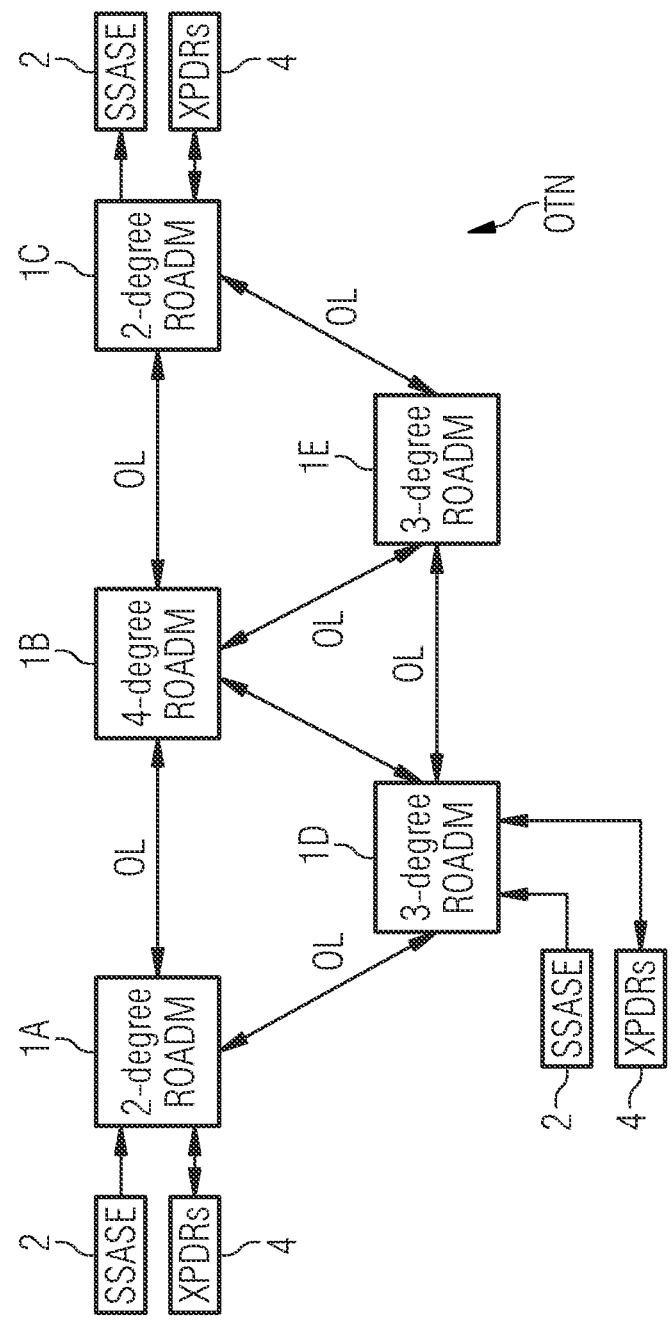
FIG. 9 illustrates a topology of a possible exemplary embodiment of an optical network according to a further aspect of the present invention.

The optical transport network OTN according to the present invention can comprise different network topologies. In addition to linear point-to-point systems, the method and apparatus according to the present invention can also be used in meshed network topologies as illustrated in the diagram of FIG. 9. This illustrated optical network OTN includes multiple multi-degree ROADM network nodes wherein various signal paths or signal routes are possible between certain network nodes 1 in the optical network OTN. In this more complex network topology, the SSASE module 2 can be provided at each ROADM network node or can be included only at a subset of ROADM network nodes in order to populate the required SSASE loading. The other ROADMs lacking SSASE modules 2 can provide the appropriate passthrough optical routing to reuse the SSASE generated by the other ROADM network nodes. In the illustrated exemplary embodiment shown in FIG. 9, the optical network comprises five optical network nodes 1A, 1B, 1C, 1D, 1E. Nodes 1A, 1C are formed by two-degree ROADM nodes comprising each an SSASE module 2 and at least one transponder 4. The data traffic channels CHs from the transponders 4 can be added to the network fiber or optical link along with the spectrally shaped ASE provided by the SSASE module 2. The network node 1B is in the illustrated embodiment a four-degree ROADM node connected to the first network node 1A and the second network node 1C as well to two three-degree ROADM nodes 1D, 1E as illustrated in FIG. 9. In the illustrated implementation, one of the two three-degree ROADM nodes, i.e. node 1D, is also connected to an SSASE module 2 and at least one transceiver 4. The different nodes 1A, 1B, 1C, 1D, 1E of the meshed optical transport network OTN illustrated in FIG. 9 are connected to each other via optical fiber links which may or may not comprise optical amplifiers.

Another aspect of the present invention in relation to a network control applies to the software architecture which can be used to control the optical network 1 including setting up and controlling the different SSASE modules 2 provided within the optical transport or transmission network OTN.

Figure 10:
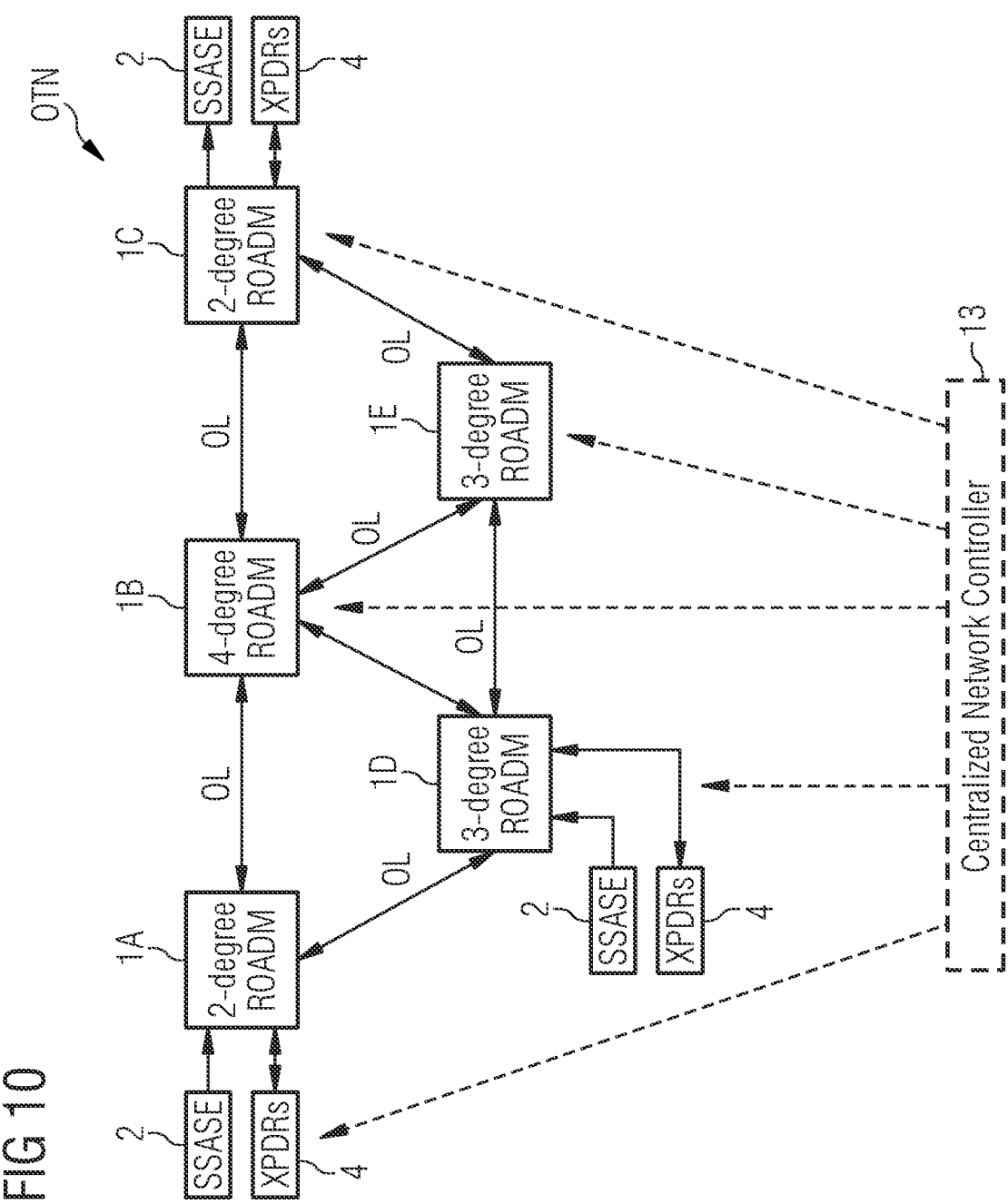
FIG. 10 shows a topology of a possible exemplary embodiment of an optical network according to the present invention.

As illustrated in the embodiment of FIG. 10, the optical network 1 having a meshed topology can comprise a centralized network controller software executed on a centralized network controller 13. The centralized network controller software can be implemented on the centralized network controller 13. The centralized network controller software can calculate, coordinate and apply the appropriate network control settings remotely to multiple network nodes 1 across the optical transport network OTN as illustrated in FIG. 10. In this embodiment, the centralized network controller 13 can supply instructions and commands to the different SSASE modules 2 within the optical transport network OTN indicating how to shape and block the amplified spontaneous emission, ASE, noise in the context of the existing data traffic channels CHs as well as broader network conditions which are known and controlled by the centralized network controller 13.

Figure 11:
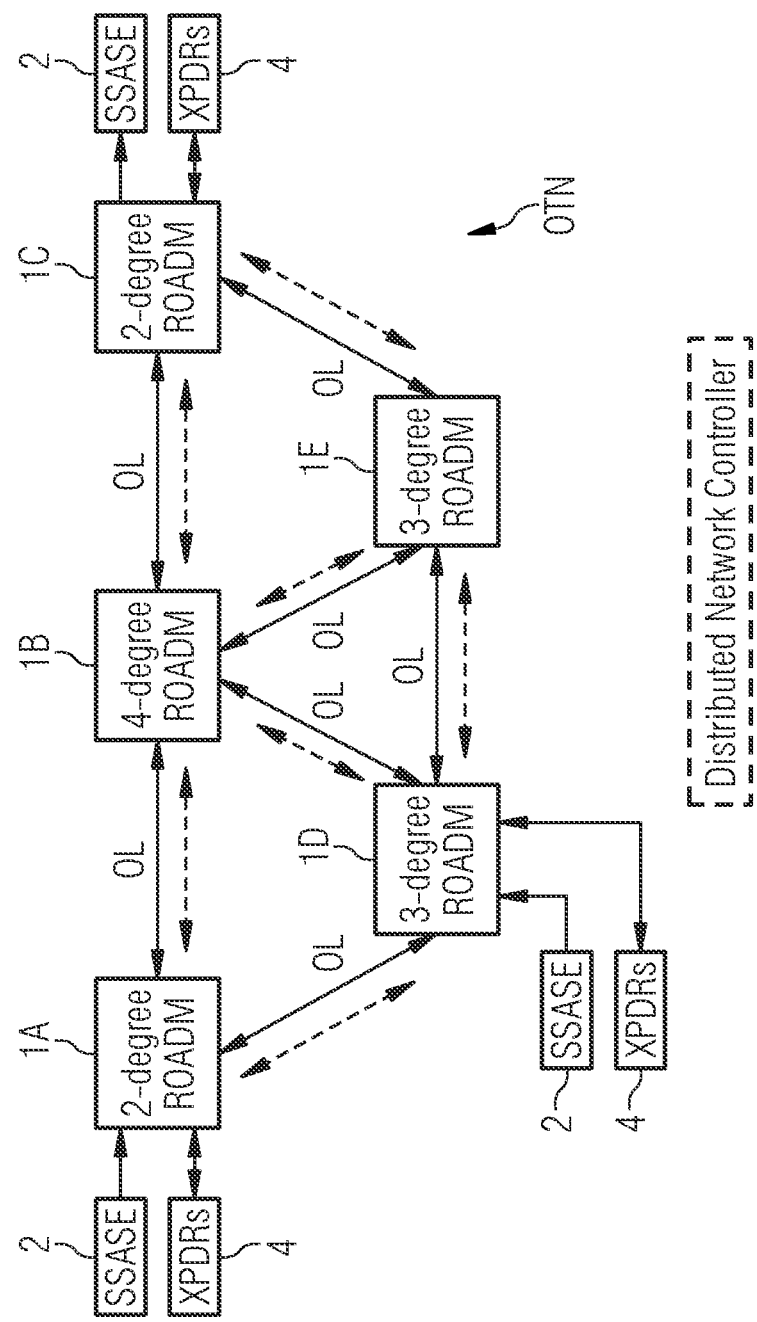
FIG. 11 shows a further alternative embodiment of an optical network according to an aspect of the present invention.

In a further possible alternative embodiment, the control can be distributed within the optical network OTN. FIG. 11 illustrates a meshed optical network OTN comprising a distributed network control software. In the illustrated exemplary embodiment of FIG. 11, the primary computation control functions are performed locally at each network node where adjacent nodes within the optical network OTN communicate with each other, for example using an optical supervisory channel OSC in order to coordinate and control the optical network OTN. This control includes the control of the SSASE modules 2. In the illustrated embodiment of FIG. 11, the SSASE modules 2 may comprise more capability for computation and intelligent control based on local information to determine how to set up the amplified spontaneous emission, ASE, shaping and blocking.

The method according to the present invention allows to determine a maximum transmission capacity, $TCAP_{MAX}$-OL, of at least one optical link, OL, within an optical network. The method according to the present invention can be used also for capacity planning of an optical transport network such as an optical transport network OTN according to ITU standard G. 707.

In a first step S1, initial transceiver settings of transceivers or transponders 4 are calculated. In step S1, worst-case nonlinear effects on a given optical link OL can be calculated using a planning tool. In a possible embodiment, the worst-case nonlinear effects on a given optical link can be calculated using a Gaussian Noise (GN) model, empirical, numerical models or numerical simulation results. These calculations can be based on known link distance, fiber types, channel symbol rates, modulation formats and spacings between the channels (e.g. 69-GBaud QPSK channels @ 75-GHz spacing over an optical link with 16×100 km spans of standard SMF).

In a further step S2, the available traffic carrying transceivers 4 on a given optical link OL are set up. The baud rates and modulation formats are selected in step S2.

In a further step S3, the required ASE power spectral density is calculated. The required ASE power spectral density comprises a power level, a spectral bandwidth and spectral gaps to neighboring data traffic carrying channels CHs.

In a further step S4, the ASE loading is set up on the given optical link OL.

In a further step S5, the bit error ratio, BER, signal to noise ratio, SNR, or Q factor can be measured on the available data traffic carrying channel(s).

Further, in step S6, the OSNR can be measured on the given optical link OL. This can be done on the available data traffic channels CHs and/or within the ASE loading frequency bands.

In a further step S7, the optical layer is optimized. The measured data within the initial settings can be used to calculate an optimum launch power (spectral density) and to tune the settings of the optical layer (i.e. amplifiers/ROADMs) to operate at target optimum levels.

In a further step S8, the bit error ratio, BER, signal to noise ratio, SNR, and Q factor on the available data traffic carrying channels CHs as well as the OSNR can be remeasured.

In a further step S9, the available operation margin OM on the available data traffic carrying channels CHs can be determined on the basis of the OSNR, SNR and Q factor.

If in step S9A it is determined that the margin is less than X dB (too low), the process loops back to step S2 changing the symbol rate and/or modulation format. If in step S9B it is decided that the margin is more than Y dB (too high), the process loops back also to step S2 with changing symbol rate and/or modulation format. If it is found that the margin is within a desired range (X dB<margin<Y dB), the channel setup is done with an optimized rate and modulation format.

In a further step S10, the maximum transport capacity can be determined. In step S10, a maximum capacity for the optical system being fully filled with data traffic carrying channels CHs is determined using the method according to the present invention as illustrated in the flowchart of FIG. 3. This can be done in a possible embodiment by taking a current aggregated or net data rate and occupied bandwidth for all existing data traffic carrying channels CHs and scaling this value to the expected aggregated data rate DR over the full available bandwidth of the optical system. There are different options to perform this scaling.

Figure 12:
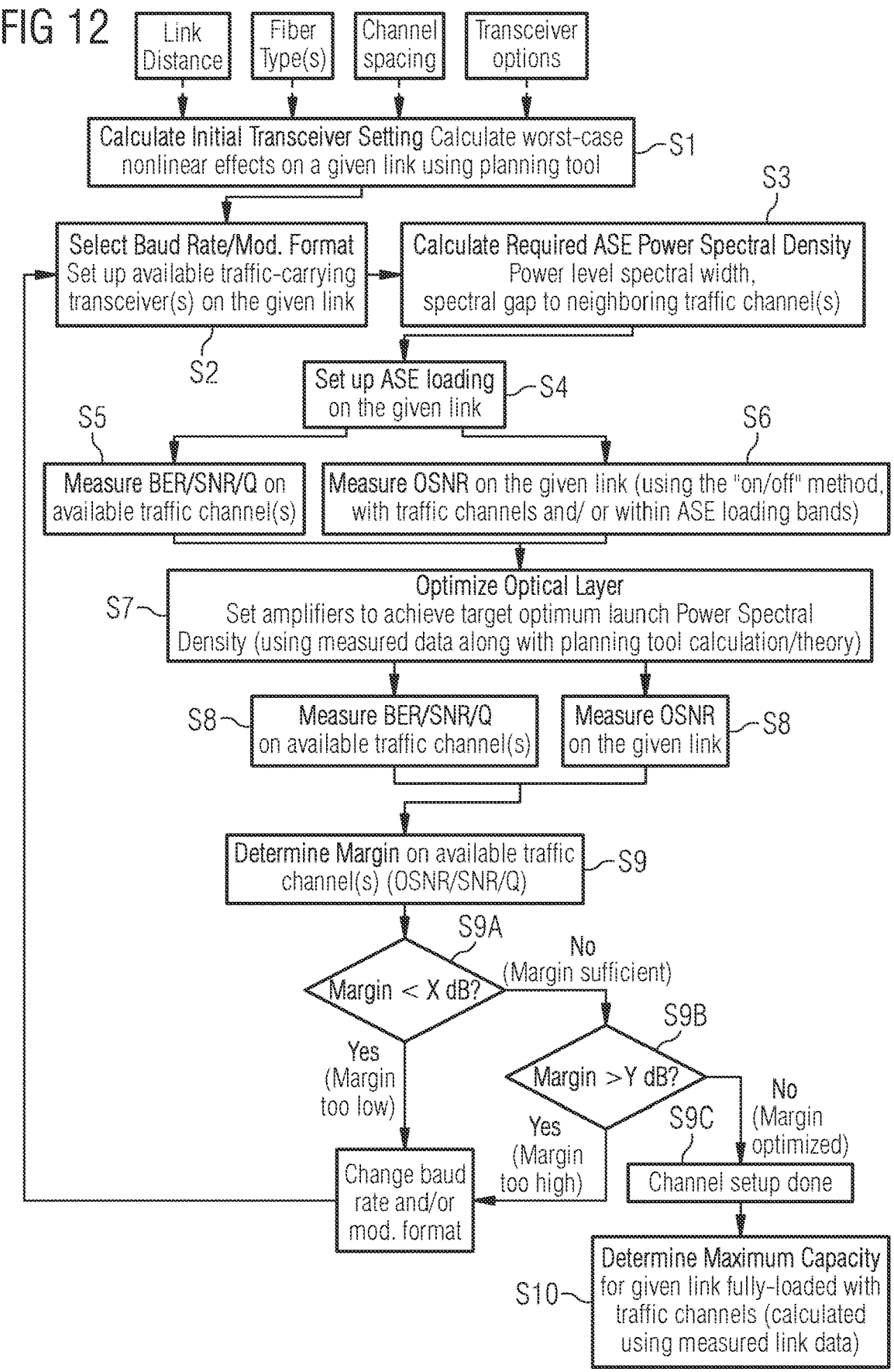
FIG. 12 shows a flowchart of a possible exemplary embodiment of a method according to the present invention.
Figure 13:
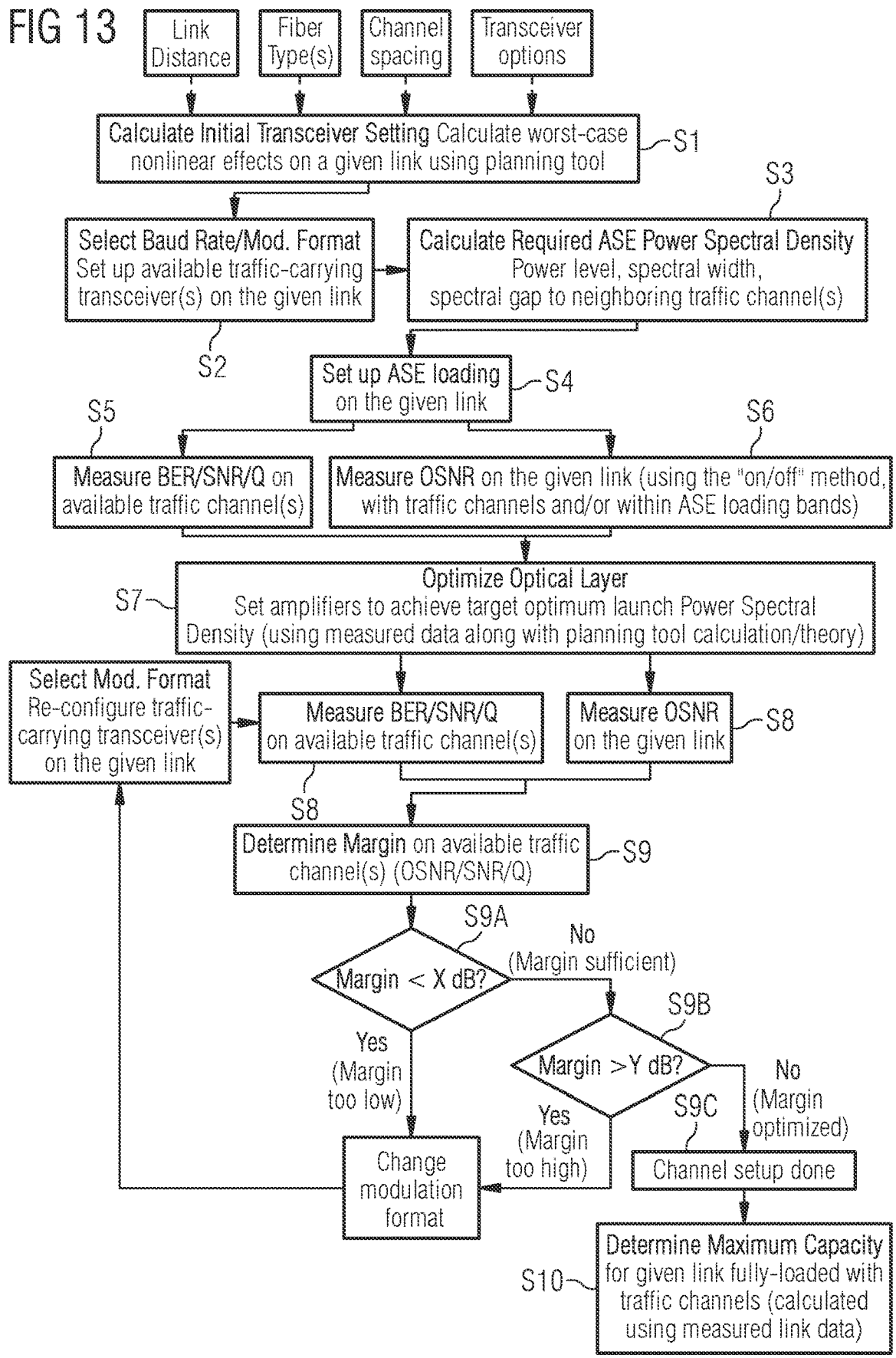
FIG. 13 shows a further flowchart of a possible exemplary embodiment of a method according to the present invention.

FIG. 13 shows a further variant of the procedure of FIG. 12 except it is assumed that a symbol rate can be fixed and/or chosen in advance but providing a variable modulation format that can be adapted to maximize the optical link capacity.

In step S1, S2, when determining the appropriate parameters for the traffic carrying transceivers 4, a channel spacing can be configured as an independent parameter or as dependent on the selected symbol rates. Changing the symbol rate can likely make a corresponding change in the channel spacing necessary but it is possible that these two parameters may be tuned independently.

Another possible embodiment involves tuning the initial traffic carrying channel to multiple wavelength locations across an available optical spectrum during the capacity planning procedure in order to determine the margin and system performance at multiple spectral locations within the full available optical spectrum. This allows for a slightly more detailed and accurate estimation of the maximum available capacity of the optical network OTN.

A simple example for deriving a maximum available transmission capacity is as follows. Existing traffic channels CHs comprise 4×150 Gbit/s channels with 50 GHz spectral occupancy per channel CH. This provides for a 600 Gbit/s current net data rate and a 200 GHz current net spectral occupancy. The full system bandwidth is 4800 GHz (current bandwidth available for new traffic=4600 GHz). In this example, the maximum available transmission capacity is (600 Gb/s/200 GHz)×4800 GHz=14400 Gbit/s=14.4 Tb/s. This is only a representative simple example. Further enhancements or adjustments of the computation can be achieved. For example, the adjustments can be based on the assumption and knowledge of performance differences between different spectral regions or wavelengths within the full system bandwidth.

In a possible embodiment the capacity on other channels is determined based on OSNR measurements on ASE-occupied spectrum as well as BER or OSNR or SNR measurements on the available channels in the respective optical link.

In a possible embodiment the capacity and performance information for the available traffic channels is determined as in the simple example. But instead of directly scaling the maximum capacity according to the current and maximum available bandwidth, a unique maximum capacity can be determined for each portion of the ASE-occupied spectrum. This is done based on OSNR measurements performed across the full spectrum (including the ASE-occupied portions), BER/SNR measurements on the traffic channels, and predetermined models for scaling the baud rate and/or modulation format to a given spectrum region with a given OSNR. Then the maximum available capacity calculated for each portion of the full system bandwidth can be summed in order to determine the maximum system capacity.

What is claimed is:

1. A method for determining a maximum transmission capacity, $TCAP_{MAX}$-OL, of an optical link, OL, within an optical transmission network, OTN, the method comprising the steps of:
    (a) loading an optical transmission spectrum of the optical link, OL, being partially occupied by at least one data traffic carrying channel, CH, with amplified spontaneous emission, ASE, noise spectrally shaped such that a transmission performance of the optical transmission spectrum fully occupied with data traffic carrying channels, CHs, is matched; and
    (b) determining the maximum transmission capacity, $TCAP_{MAX}$-OL, of the optical link, OL, on the basis of measured link data transported through the optical link, OL, via the at least one data traffic carrying channel, CH,
    wherein a power spectral density, PSD, of the amplified spontaneous emission, ASE, noise is shaped to match a linear and nonlinear crosstalk performance of the optical transmission spectrum, OPT-SPEC, fully occupied with data traffic channels, CH,
    wherein the maximum transmission capacity, $TCAP_{MAX}$-OL, of the optical link, OL, is determined as an aggregated data rate, DR, provided by the optical link, OL, on the basis of a data rate, DR, provided by the measured link data transported via the at least one data traffic carrying channel, CH, and on the basis of an aggregated bandwidth, BW-CH, occupied by the respective data traffic carrying channels, CHs, and a total bandwidth, BW-OPT-SPEC, of the optical transmission spectrum, OPT-SPEC, of said optical link, OL.

2. The method according to claim 1 wherein if an additional data traffic carrying channel, CH, is added to the optical link, OL, by means of an optical multiplexing structure, the amplified spontaneous emission, ASE, noise is blocked across a bandwidth, BW-CH, occupied by said added data traffic carrying channel, CH, including or not including an optional guard frequency band.

3. The method according to claim 1 wherein the data traffic carrying channels, CHs, are provided by transponders connected by means of an optical multiplexing structure to a near-end side of the optical link, OL.

4. The method according to claim 3 wherein the amplified spontaneous emission, ASE, noise is generated and spectrally shaped by an ASE noise module, SSASE, connected to the near-end side of the optical link, OL, by means of the optical multiplexing structure.

5. The method according to claim 4 wherein the amplified spontaneous emission, ASE, noise is generated by an ASE source of the ASE module, SSASE, and spectrally shaped by a flexible-grid capable wavelength selective switch, WSS, of the ASE noise module, SSASE, controlled by a controller of the ASE noise module, SSASE, according to parameters received by the controller or determined by the controller from input data carrying information about existing data traffic carrying channels, CHs, said parameters comprising power levels, spectral bandwidths of the data traffic carrying channels, CHs, and channel spacings between neighboring data traffic carrying channels, CHs.

6. The method according to claim 1 wherein a transmission performance, TPER, of the at least one data traffic carrying channel, CH, is measured on a far-end side of the optical link, OL, and comprises as performance metrics in particular a bit error ratio, BER, a signal to noise ratio, SNR, a Q-factor, an error vector magnitude, EVM, and/or a generalized optical signal to noise ratio, GOSNR.

7. The method according to claim 1 wherein an optical signal to noise ratio, OSNR, of the optical link, OL, is measured on a far-end side of the optical link, OL, in frequency bands occupied by the at least one data traffic carrying channel, CH, and/or within ASE loaded frequency bands.

8. The method according to claim 1 wherein one or more optical amplifiers and/or a reconfigurable optical add-drop multiplexer, ROADM, of the optical link, OL, are tuned to achieve a target optimum launch power spectral density, PSD, of an optical signal launched into a near-end side of the optical link, OL, using measured link data transported through the optical link, OL, via the at least one data traffic carrying channel, CH.

9. The method according to claim 1 wherein an operation margin, OM, of the at least one data traffic carrying channel, CH, is determined as a difference calculated between a transmission performance, TPER, of the data traffic carrying channel, CH, measured on a far-end side of the optical link, OL, and a predetermined transmission performance threshold, TPER-TH, for error-free transmission provided by a model.

10. The method according to claim 9 wherein a data rate DR, of the at least one data traffic carrying channel, CH, is adjusted depending on the determined operation margin, OM, of the data traffic carrying channel, CH, to maximize a transmission capacity, TCAP-CH, of the respective data traffic carrying channel, CH.

11. The method according to claim 10 wherein the data rate, DR, of the at least one data traffic carrying channel, CH, is adjusted through a change of a symbol rate and/or through a change of a modulation format provided by transponders connected to a near-end side of the optical link, OL.

12. The method according to claim 1 wherein after a transmission capacity, TCAP-CH, of the data traffic carrying channels, CHs, has been maximized, a maximum transmission capacity, $TCAP_{MAX}$-OL, of the optical link, OL, is determined as an aggregated data rate, DR, provided by the optical link, OL.

13. The method according to claim 1 wherein the optical transmission network, OTN, comprises a wavelength division multiplexed, WDM, network comprising data traffic carrying channels, CHs, having allocated carrier frequencies.

14. A system of an optical transmission network, said system comprising:
an amplified spontaneous emission, ASE, noise module, SSASE, adapted to provide an amplified spontaneous emission, ASE, noise spectrally shaped such that a transmission performance of an optical transmission spectrum, OPT-SPEC, provided by an optical link, OL, of said optical transmission network fully occupied with data traffic carrying channels, CHs, is matched;
an optical multiplexing structure adapted to combine the spectrally shaped amplified spontaneous emission, ASE, noise provided by the amplified spontaneous emission noise, ASE, noise module, SSASE, of the network node with wavelengths of data traffic carrying channels,
wherein the amplified spontaneous emission, ASE, noise module, SSASE, is further adapted to shape a power spectral density, PSD, of the amplified spontaneous emission, ASE, noise to match a linear and nonlinear crosstalk performance of the optical transmission spectrum, OPT-SPEC, fully occupied with data traffic channels, CH; and
means for determining a maximum transmission capacity, $TCAP_{MAX}$-OL, of the optical link, OL, as an aggregated data rate, DR, provided by the optical link, OL, on the basis of a data rate, DR, provided by a measured link data transported via at least one data traffic carrying channel, CH, and on the basis of an aggregated bandwidth, BW-CH, occupied by the respective data traffic carrying channels, CHs, and a total bandwidth, BW-OPT-SPEC, of the optical transmission spectrum, OPT-SPEC, of said optical link, OL.

15. The system according to claim 14 wherein the optical multiplexing structure comprises a reconfigurable optical add-drop multiplexer, ROADM.

16. The system according to claim 14 wherein the amplified spontaneous emission, ASE, noise module, SSASE, comprises:
an amplified spontaneous emission, ASE, noise source adapted to generate an amplified spontaneous emission, ASE, noise and
a wavelength selective switch, WSS, adapted to spectrally shape the generated amplified spontaneous emission, ASE, noise.

17. The system according to claim 16 further comprising a controller adapted to control the wavelength selective switch, WSS, according to parameters received by the controller or determined by the controller from input data carrying information about existing data traffic carrying channels, CHs.

* * * * *